United States Patent [19]

Sobkowiak et al.

[11] Patent Number: 5,793,014
[45] Date of Patent: Aug. 11, 1998

[54] PROCESS AND DEVICE FOR RESTORING THE TIGHTNESS OF CONNECTING ELEMENTS SUCH AS WATER BOXES OF ALTERNATORS WITH A MIXED WATER-HYDROGEN COOLING SYSTEM

[75] Inventors: Lucien Sobkowiak, Brunoy; Patrick Adragna, Bourg Saint Andeol, both of France

[73] Assignee: Electricite de France - Service National, Paris, France

[21] Appl. No.: 773,236

[22] Filed: Dec. 23, 1996

[30] Foreign Application Priority Data

Dec. 27, 1995 [FR] France .................. 95 15584

[51] Int. Cl.$^6$ .................................................. B23K 26/00
[52] U.S. Cl. .................. 219/121.65; 219/121.6; 219/121.66; 219/121.85; 29/402.07
[58] Field of Search .............. 219/121.6, 121.63, 219/121.64, 121.65, 121.66, 121.68, 121.69, 121.73, 121.8, 121.84, 121.85; 228/261; 134/1, 22.11, 24; 29/81.01, 81.021, 888.021, 890.031, 402.06, 402.07

[56] References Cited

U.S. PATENT DOCUMENTS

| | | |
|---|---|---|
| 4,066,203 | 1/1978 | Davies . |
| 4,629,917 | 12/1986 | Brem . |
| 4,720,621 | 1/1988 | Langen .................. 219/121.6 |
| 4,784,491 | 11/1988 | Penney et al. ............. 219/121.84 X |
| 4,824,011 | 4/1989 | Maus et al. ............. 219/121.85 X |
| 4,920,994 | 5/1990 | Nachbar ................ 134/1 |
| 5,113,802 | 5/1992 | Le Blanc .................. 134/1 X |
| 5,151,134 | 9/1992 | Boquillon et al. ............ 134/1 |
| 5,482,561 | 1/1996 | Yeung et al. ............... 134/1 |
| 5,531,857 | 7/1996 | Engelsberg et al. ........... 219/121.68 X |
| 5,581,869 | 12/1996 | Travaly .................. 29/402.07 X |
| 5,643,472 | 7/1997 | Engelsberg et al. .......... 134/1 X |

FOREIGN PATENT DOCUMENTS 3-27866  2/1991  Japan ............... 219/121.85

OTHER PUBLICATIONS

Database WPI Week 7939, Derwent Publications, Ltd. London, G.B., AN 79-j3138b, XP002000123 & SU-A-639 084 (Bykov), Dec. 28, 1978.

Primary Examiner—Gregory L. Mills
Attorney, Agent, or Firm—Sughrue, Mion, Zinn, Macpeak & Seas, PLLC

[57] ABSTRACT

The process comprises separating the connecting element (3) from one of the pipes (4) which connects it to the circuit so as to open up an opening (6) of the connecting element and thereby gain access to the interior of the connecting element while leaving the latter in position in the circuit of the alternator, descaling at least a part of the interior surface of the connecting element by removal of an oxidized layer covering the interior surface (18) by use of a laser beam (16) introduced in the interior chamber (19) of the connecting element (3), cleaning the interior chamber (19) of the connecting element by suction of particles of matter resulting from the action of the laser beam (16), depositing a layer of brazing material on the surface (18) of the interior chamber (19) of the connecting element whose tightness must be restored, and melting the brazing material by means of the laser beam (16).

17 Claims, 3 Drawing Sheets

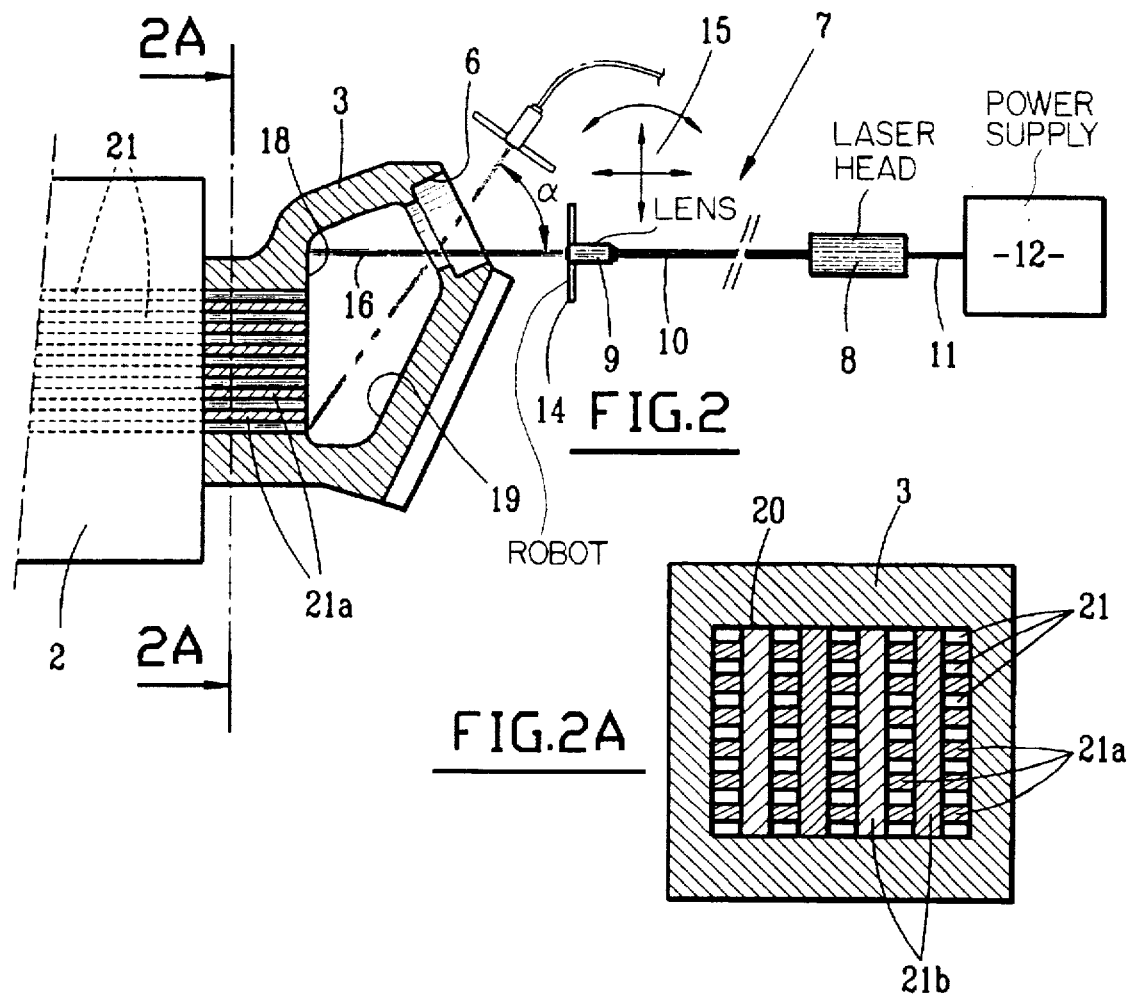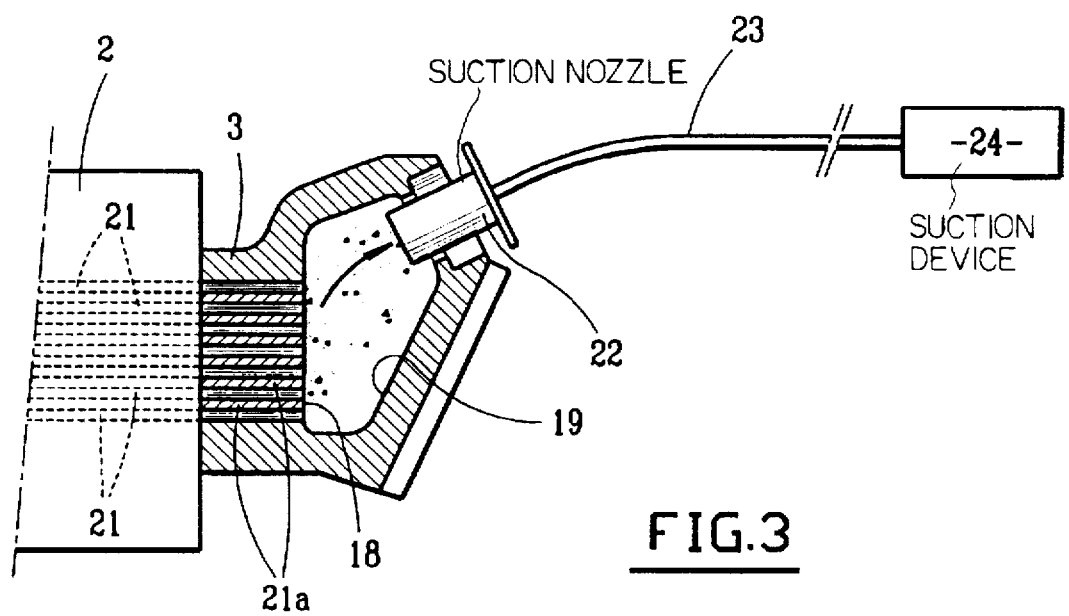

PROCESS AND DEVICE FOR RESTORING THE TIGHTNESS OF CONNECTING ELEMENTS SUCH AS WATER BOXES OF ALTERNATORS WITH A MIXED WATER-HYDROGEN COOLING SYSTEM

BACKGROUND OF THE INVENTION

The present invention relates to the maintenance of alternators and more particularly concerns the restoration of the tightness or sealing of water boxes of the bars of alternators with a mixed water-hydrogen cooling system.

Alternators of the aforementioned type usually comprise water boxes each associated with a bar of the alternator and connected by pipes to a manifold for the cooling fluid.

In the course of a prolonged operation of the alternator, the water boxes undergo a soiling due to deposits of copper oxide and some of them present tightness or sealing defects in the region of the brazings existing between the conductors of the bar and the body of the water box in which they are fixed.

To resolve this problem, use is usually made of chemical or mechanical sandblasting processes and shot blasting.

It has also been envisaged to effect by an internal intervention an injection of epoxy resin aerosols in the box.

Such a process is difficult to apply and is incompatible with the physico-chemical constitution of the cooling fluid employed in cooling systems of alternators.

It is also possible to effect by external intervention the deposition of a sealing resin at the rear of the bundle of conduits between the layers of conductors.

This solution has an insufficient result since it does not ensure a total tightness owing to the fact that it is impossible to achieve an effective and complete cleaning of the surfaces in particular inside the bundle.

It is also possible to replace the defective winding bar, but this is very expensive and requires the removal of one or more bars.

SUMMARY OF THE INVENTION

An object of the invention is to overcome the drawbacks of the processes known in the art by providing a process for restoring the tightness in situ which is of reasonable cost and furthermore permits an intervention with maximum efficiency in places difficult to reach.

The invention therefore provides a process for restoring the tightness of connecting elements of circuits passed through by a fluid, in particular of water boxes of alternators with a mixed water-hydrogen cooling system, characterized in that it comprises separating the connecting element from one of the pipes connecting it to the circuit so as to form an opening of said element and thereby provide access to the interior of the latter while leaving it in position in the circuit, descaling at least a part of the interior surface of the connecting element by removal of an oxidized layer covering said surface by means of a laser beam introduced in the interior chamber of the connecting element, cleaning the interior chamber of the connecting element by the suction of particles of matter resulting from the action of the laser beam, depositing a layer of brazing on the surface of the interior chamber of the element the tightness of which must be restored, and melting said brazing by means of said laser beam.

A better understanding of the invention will be had from the following description with reference to the accompanying drawings which are given solely by way of example and in which:

BRIEF DESCRIPTION OF THE DRAWINGS

FIG. 2 is a sectional view of a water box of the circuit shown in FIG. 1 in the course of the operation for removing the oxidized layer in the interior chamber of said box;

FIG. 2A is a partial sectional view taken on line 2A—2A of FIG. 2;

FIG. 3 is a view similar to FIG. 2 of the operation for the suction of dust out of the chamber of the water box;

DESCRIPTION OF THE PREFERRED EMBODIMENTS

Figure 1:
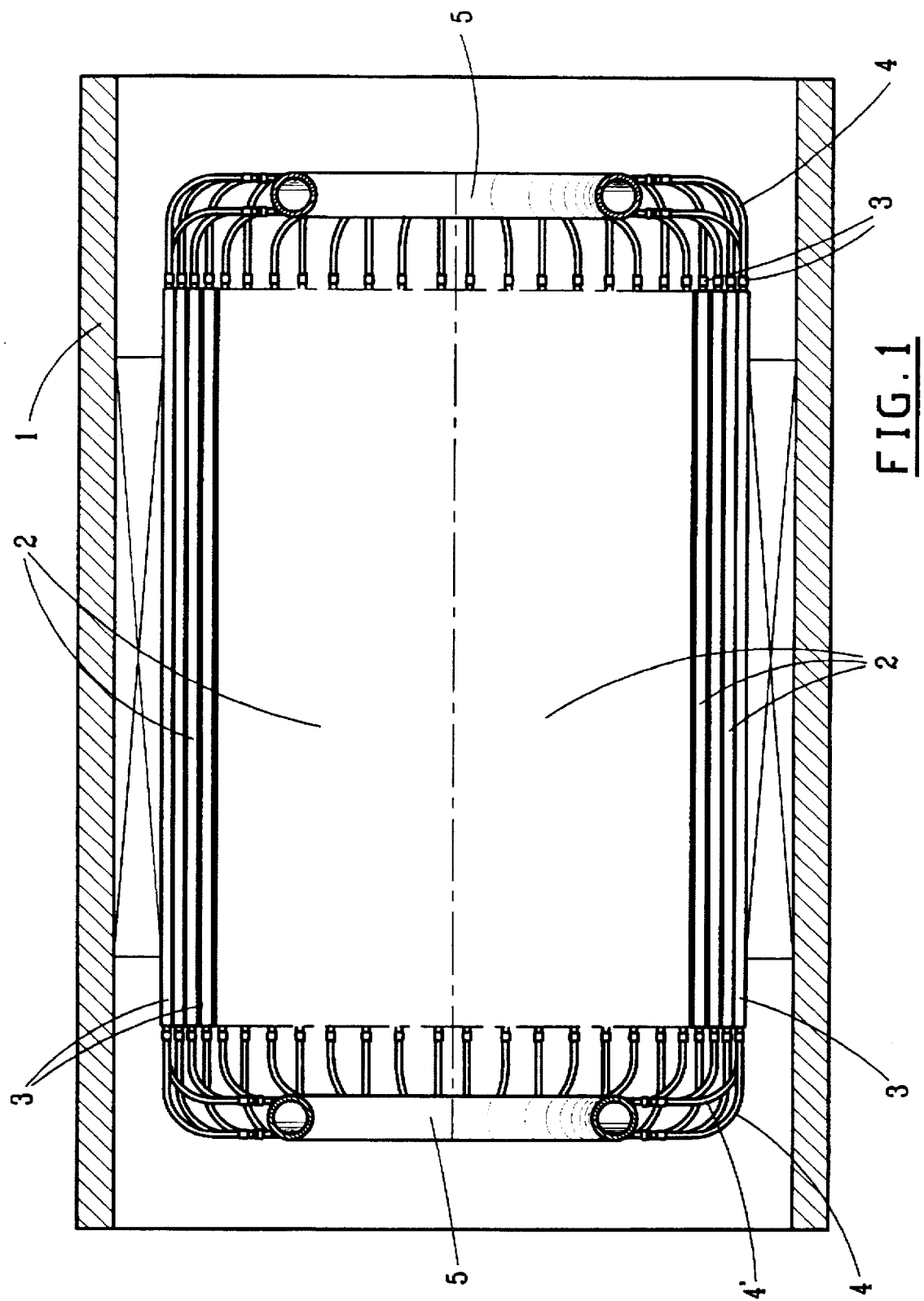
FIG. 1 is a partial sectional view of a cooling circuit for the bars of a stator of an alternator of the type with a mixed water-hydrogen cooling system.

FIG. 1 shows partially and diagrammatically the arrangement of the water boxes of a circuit for cooling bars of an electric alternator with a mixed water-hydrogen cooling system, only the water cooling circuit of the stator being shown.

The stator 1 of such an alternator is provided with a group of bars constituting the stator winding which carry at each end a connecting element such as a water box 3.

Each water box is connected by a pipe 4 to an annular manifold 5 for the stator cooling fluid of the alternator, in this instance water.

The process according to the invention essentially employs the laser beam and industrial fibroscopy technology.

It has essentially for object to intervene directly on the machine without replacement of the bars whose water boxes present tightness or sealing defects in the region of the brazings.

The process according to the invention, the various stages of which will be described with reference to FIGS. 2 to 5, comprises, after having found a bar whose water box presents a tightness defect, withdrawing from the water box 3 its pipe 4 connecting it to the manifold 5 so as to open up the entrance 6 of the water box 6.

A device for removing the oxidized layer and the pollution from the interior surface of the water box is then placed in position.

This device carries the general reference numeral 7 and comprises a laser head 8 connected to a focusing lens 9 through a fibre-optic cable 10. The laser is connected through electric conductors 11 to an electronic inspection and power supply box 12.

The lens 9 is mounted on a robot 14 which is programmed and remote-controlled by a computer (not shown).

It can therefore be displaced in different directions indicated by the crossed arrows 15 to permit the laser beam 16 it emits to scan the whole of the surface 18 of the interior chamber 19 of the box which must be descaled.

The resulting angular displacement of the lens 9 is shown in FIG. 2 by the angle a made by the laser beam 16 between its position shown in full line in which it impinges on the upper part of the surface 18 of the interior chamber 19 of the water box and the inclined position shown in dot-dash line in which it impinges on the lower part of said surface 18.

FIG. 2A is a sectional view of the part of the water box 3 adapted to connect the water box with a bar 2 to be cooled. Formed in the water box 3 is a rectangular opening 20 in which are engaged hollow conductors 21 and solid conductors 21a which extend through the bar 2, cooling fluid circulating in the hollow conductors 21. The columns of hollow conductors 21 and solid conductors 21a are separated by metal plates 21b constituting spacer members.

It will be understood that the surface 18 of the interior chamber 19 of the water box onto which the hollow conductors 21 in the form of tubes open, is soiled by a layer of oxidation or other polluting matter and that this deposit results in tightness defects between the opening 20 and the conductors 21, 21a it contains.

Indeed, the deposits of oxidized substance may accentuate the brazing defects which may exist between the conductors 21 and 21a and the opening 20.

In the course of the descaling operation, the whole of the interior surface 18 of the chamber 19 is therefore first of all scanned by means of the laser beam 16 and the oxidized layer deposited on this surface is destroyed by a thermal removal thereof.

After having carried out this first descaling operation, the laser beam device is withdrawn and replaced by suction means 22 comprising a suction nozzle whose shape and size are adapted to the opening 6 of the waterbox, a hose 23 and a suction device 24.

In this way the particles resulting from the destruction of the oxidized layer in the course of the preceding operation are evacuated from the chamber 19.

This suction operation illustrated in FIG. 3 is employed alternately with the descaling operation which may be repeated as many times as necessary to achieve a thorough cleaning of the interior surface 18 of the chamber 19 of the water box.

After the last suction operation a solvent is injected in the box to achieve a final cleaning of the descaled surface 18.

Figure 4:
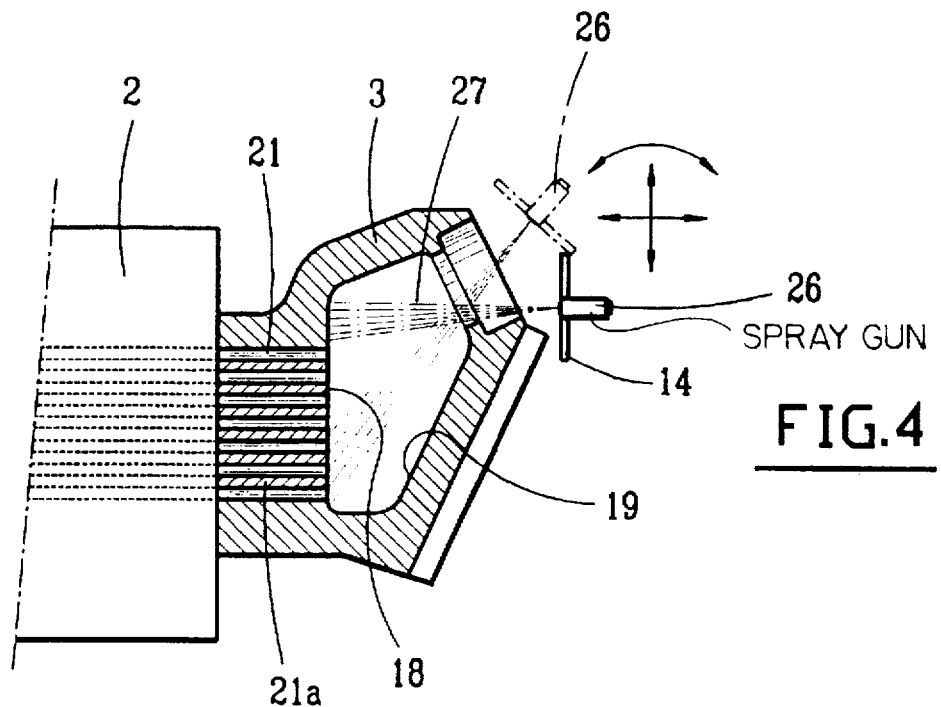
FIG. 4 is a view similar to FIG. 2 of the operation for depositing a layer of brazing in the chamber.

The aforementioned cleaning operation is followed by an operation for depositing a layer of brazing material illustrated in FIG. 4.

To carry out this operation, a spray gun 26 is employed and mounted on the robot 14 instead of the lens 9 of the laser beam descaling device and there is sprayed onto the surface 18 of the interior chamber 19 of the water box 3 a layer of brazing material by causing the jet 27 of the gun 26 to scan the whole of the surface 18.

This operation may also be carried out with a pulsating plasma gun.

When the brazing material is deposited on the surface 18 of the interior chamber 19, this brazing material is melted by again substituting for the gun 26 the lens 9 of the laser device and causing the laser beam to travel through the same path of the scanning of the surface 18 it had travelled through in the course of the descaling operation.

In this way the molten brazing material penetrates the slits opened up in the course of the descaling operation and restores the tightness of the water box.

Figure 5:
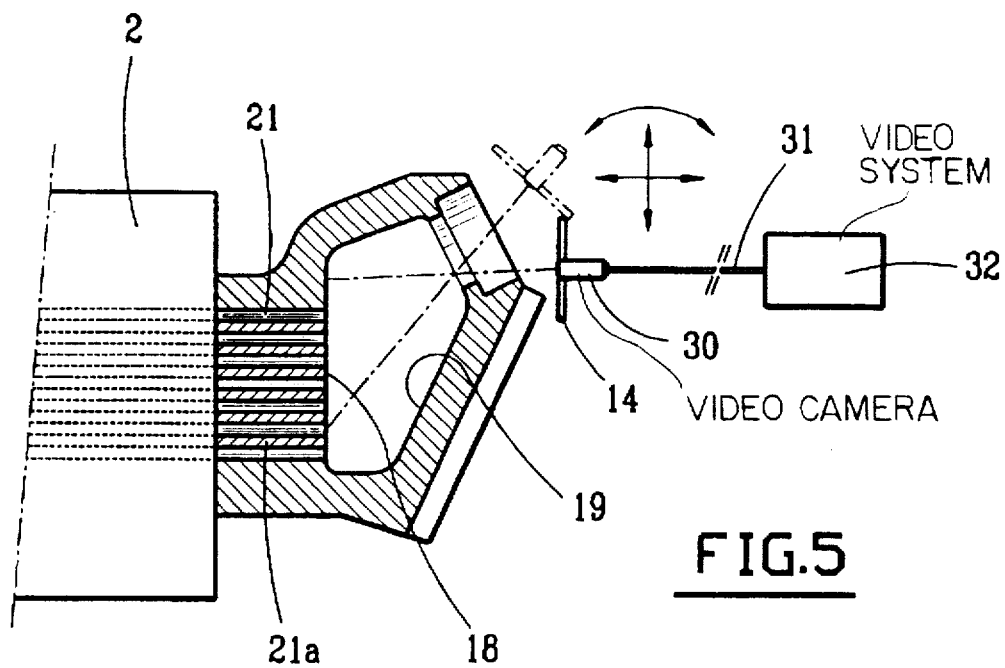
FIG. 5 is a view similar to FIG. 2 of the inspection effected between the various stages of the process according to the invention.

Between the operations for descaling, dust removal by suction and deposition of a new layer of brazing, material an inspection operation is carried out by means of the fibro scopic system shown in FIG. 5.

A video camera 30 is mounted on the robot 14 and made to scan by means of the latter the whole of the surface which is subjected in succession to the descaling, dusting and brazing material deposition treatments.

The camera 30 is connected through a bundle of fibre-optic cables 31 to a video system 32 which permits observing the surface 18 of the chamber 19 of the water box on a screen.

By means of the inspection system shown in FIG. 5 employed between the various operations for treating the internal surface of the water box, it is possible to detect the micro-slits appearing after the descaling operation and control the filling of these micro-slits by means of the layer of brazing material deposited in the course of the operation illustrated in FIG. 4.

The process described hereinbefore has been applied to the restoration of the tightness of water boxes of an alternator. However, it is possible to envisage its use for restoring the tightness or sealing of any connecting element between elements of a circuit for a fluid and in particular a cooling fluid.

For example, it might be envisaged to apply the process of the invention to restoring the tightness or sealing of petrochemical components, of equipments of the food, maritime and railway industry, or mining, nuclear, industrial, automobile or military equipments.

What is claimed is:

1. Process for restoring tightness of a connecting element of a circuit passed through by a fluid, said process comprising the following steps: separating said element from a pipe connecting it to said circuit so as to form an opening of said connecting element and thereby provide access to an interior chamber of said connecting element while leaving said connecting element in position in said circuit, descaling at least a part of an interior surface of said interior chamber by removal of an oxidized layer covering said at least a part of said interior surface by means of a laser beam introduced in said interior chamber, cleaning said interior chamber by suction of particles of matter resulting from action of said laser beam, depositing a layer of brazing material on said at least a part of said interior surface of said interior chamber, and melting said brazing by means of said laser beam.

2. Process according to claim 1, comprising subjecting, in the course of said descaling and said melting of said brazing, material a focusing lens of said laser beam to movements which cause said laser beam to scan said at least a part of said interior surface.

3. Process according to claim 2, comprising effecting said suction of said particles of matter resulting from said action of said laser beam by means of a suction nozzle introduced through said opening of said connecting element, said nozzle being connected to a suction device.

4. Process according to claim 3, comprising, after the last operation for said suction of said particles of matter resulting from the action of said laser beam, injecting in said interior chamber a solvent for ensuring a final cleaning of said at least a part of said interior surface.

5. Process according to claim 2, comprising repeating said descaling and suction operations at least one.

6. Process according to claim 1, comprising effecting said suction of said particles of matter resulting from said action of said laser beam by means of a suction nozzle introduced through said opening of said connecting element, said nozzle being connected to a suction device.

7. Process according to claim 6, comprising repeating said descaling and suction operations at least one.

8. Process according to claim 6, comprising, after said suction of said particles of matter injecting in said interior chamber a solvent for ensuring a final cleaning of said at least a part of said interior surface.

9. Process according to claim 1, comprising effecting said deposition of said brazing material on said at least a part of said interior surface of said interior chamber by causing a spray gun to scan said at least a part of said interior surface of said interior chamber of said connecting element the tightness of which must be restored.

10. Process according to claim 1, comprising subjecting, between a descaling operation and a particle suction operation, between a particle suction operation and an operation for depositing a layer of brazing, material and after an operation for melting said brazing, material said at least a part of said interior surface to an inspection comprising observing the state of said at least a part of said interior surface by means of a video camera and a video system.

11. A device for treatment of at least a part of an interior surface of an interior chamber of a connecting element of a circuit passed through by a fluid, so as to restore tightness of said connecting element by a process comprising the following steps: separating said connecting element from a pipe connecting it to said circuit so as to form an opening of said connecting element and thereby provide access to said interior chamber of said connecting element while leaving said connecting element in position in said circuit, descaling said at least a part of said interior surface of said interior chamber by removal of an oxidized layer covering said at least a part of said interior surface by means of a laser beam introduced in said interior chamber, cleaning said interior chamber by suction of particles of matter resulting from action of said laser beam, depositing a layer of brazing material on said at least a part of said interior surface of said interior chamber, and melting said brazing material by means of said laser beam, said device comprising in combination: a laser device including a lens for directing, in the course of said descaling and said melting of said brazing material, a laser beam onto said at least a part of said interior surface of said connecting element, a laser head, a fibre-optic cable connecting said laser head to said lens, an electronic inspection and power supply box connected to said laser head, displacing means carrying said lens for moving said lens and thereby causing said beam to scan said at least a part of said interior surface, means for the suction of the particles of the matter resulting from said descaling action of said laser beam, means for depositing a brazing material on said at least a part of said interior surface, said means for depositing said brazing material being capable of being substituted for said lens on said displacing means.

12. Device according to claim 11, further comprising means for inspecting said at least a part of said interior surface including a video system and a camera which may be substituted selectively for said lens and for said brazing material depositing means on said displacing means, and a bundle of fibre-optic cables connecting said video system to said camera.

13. Device according to claim 12, wherein said brazing material depositing means comprises a spray gun.

14. Device according to claim 13, wherein said displacing means for moving in turn said lens of said laser device, said brazing material depositing means and said video camera comprises a robot and a computer operatively connected to said robot for programming and remotely controlling said robot.

15. Device according to claim 12, wherein said displacing means for moving in turn said lens of said laser device, said brazing material depositing means and said video camera comprises a robot and a computer operatively connected to said robot for programming and remotely controlling said robot.

16. Device according to claim 11, wherein said brazing material depositing means comprises a spray gun.

17. Device according to claim 16, wherein said displacing means for moving in turn said lens of said laser device, said brazing material depositing means and said video camera comprises a robot and a computer operatively connected to said robot for programming and remotely controlling said robot.

* * * * *